US012812376B2

(12) United States Patent
Simon et al.

(10) Patent No.: US 12,812,376 B2
(45) Date of Patent: Nov. 24, 2026

(54) AUTOMATED CREDENTIAL SCANNING, ROTATION, AND VAULTING

(71) Applicant: T-Mobile USA, Inc., Bellevue, WA (US)

(72) Inventors: Jeffrey Scott Simon, Issaquah, WA (US); Christopher Matthew Wallace, Redmond, WA (US); Geoffrey Todd Gibson, Ben Wheeler, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 21 days.

(21) Appl. No.: 18/819,506

(22) Filed: Aug. 29, 2024

(65) Prior Publication Data

US 2026/0067688 A1 Mar. 5, 2026

(51) Int. Cl.
*H04W 12/06* (2021.01)

(52) U.S. Cl.
CPC .................................. *H04W 12/068* (2021.01)

(58) Field of Classification Search
CPC ....................... H04W 12/068; H04L 2463/082
See application file for complete search history.

(56) References Cited

U.S. PATENT DOCUMENTS

2019/0245856 A1* 8/2019 Irwan .................... H04L 9/0643
2020/0193065 A1* 6/2020 Smith ..................... G06F 21/73
2023/0082633 A1* 3/2023 Seletskiy ............ H04L 63/1425 726/7
2023/0098097 A1* 3/2023 Vaid .................... H04W 12/033 726/1

* cited by examiner

*Primary Examiner* — Anh Nguyen
(74) *Attorney, Agent, or Firm* — Foley IP Law, PLLC

(57) ABSTRACT

Solutions are disclosed that provide for automated credential scanning, rotation, and vaulting. A multi-factor authentication channel is established for each network function (NF), of a plurality of NFs of a wireless network (e.g., cellular), having a subscriber interface and an out-of-band management interface. An attempt to log into each NF is made using test credentials from a first library of credentials and the multi-factor authentication channel. The first library of credentials includes default credentials, possibly organized by NF vendors model ID, and easily-guessed credentials. When the login attempt is successful (meaning the default or easy credentials were being used), new credentials are generated and stored in a password vault (a second library of credentials) associated with the NF. Some NFs may require use of a vendor-specified software application interface for logging in, which is launched and used for the login attempts.

20 Claims, 9 Drawing Sheets

AUTOMATED CREDENTIAL SCANNING, ROTATION, AND VAULTING

BACKGROUND

Threat actors may view mobile network operators (MNOs, such as operators of wireless/cellular networks) as lucrative targets, due to the proliferation of smartphones, connected devices, and internet of things (IoT) devices and their reliance in banking, social media, smart homes, connected cars, and other infrastructure. Threat actors may use MNO services and target both wireless subscribers and MNO infrastructure (e.g., telecommunication (telco) network functions (NFs)).

MNOs store sensitive information for each subscriber, such as personal identifiable information (PII), credit card numbers, phone numbers, and cellphone equipment identifiers (IDs). Such information may be exploited in numerous ways by a threat actor to generate monetary gain and cause disruptions and damage. Unfortunately, managing large global data communications and computing environments with millions of devices, compute instances, and user accounts, is challenging, given the rapidly (e.g., daily or even more often) changing environments. It is common for organizations to prioritize their operational and cybersecurity oversight on (what is deemed as) more critical platforms and devices, at the expense of unintentionally relaxing oversight of (what is deemed as) lesser-critical platforms and devices.

Default passwords, and easily-guessed passwords, on platforms and devices are one of the primary methods that threat actors use to gain unauthorized access to networks. However, some device and platform operational activities could cause the credentials to be reset to a factory defaults. For example, a device replacement with a new unit that has the factory default, and a software update of a device may reset a password to the factory default. In a large environment, these default credentials may go unnoticed, creating a pathway for a threat actor to gain unauthorized access into the network.

SUMMARY

The following summary is provided to illustrate examples disclosed herein, but is not meant to limit all examples to any particular configuration or sequence of operations.

Solutions are disclosed that provides for automated credential scanning, rotation, and vaulting. Examples perform a process that includes, for each network function (NF), of a plurality of NFs of a wireless network, attempting to log into each NF using test credentials from a first library of credentials; based on successfully logging into a first NF, using the test credentials, generating new credentials for the first NF, wherein the new credentials for the first NF are different than all credentials in the first library of credentials and in a second library of credentials; logging into the second library of credentials using vault credentials for the second library of credentials; and storing the new credentials for the first NF in the second library of credentials, associated with the first NF.

Additional examples perform a process that includes, for each network function (NF), of a plurality of NFs of a wireless network, having a subscriber interface and an out-of-band management interface, establishing an out-of-band authentication channel; attempting to log into each NF using test credentials from a first library of credentials and the out-of-band authentication channel; based on successfully logging into a first NF, using the test credentials and the out-of-band authentication channel for the first NF, generating new credentials for the first NF, wherein the new credentials for the first NF are different than all credentials in the first library of credentials and in a second library of credentials; logging into the second library of credentials using vault credentials and out of band authentication for the second library of credentials; and storing the new credentials for the first NF in the second library of credentials, associated with the first NF.

Additional examples extend beyond NFs of a wireless network and perform a process that includes, for each functional component of a network having a unique log in interface, establishing an out-of-band authentication channel; attempting to log into each functional component using test credentials from a first library of credentials and the out-of-band authentication channel; based on successfully logging into a first functional component, using the test credentials and the out-of-band authentication channel for the first functional component, generating new credentials for the first functional component, wherein the new credentials for the first functional component are different than all credentials in the first library of credentials and in a second library of credentials; logging into the second library of credentials using vault credentials and multi-factor authentication for the second library of credentials; and storing the new credentials for the first functional component in the second library of credentials, associated with the first functional component.

BRIEF DESCRIPTION OF THE DRAWINGS

The disclosed examples are described below with reference to the accompanying drawing figures listed below, wherein.

Figure 1:
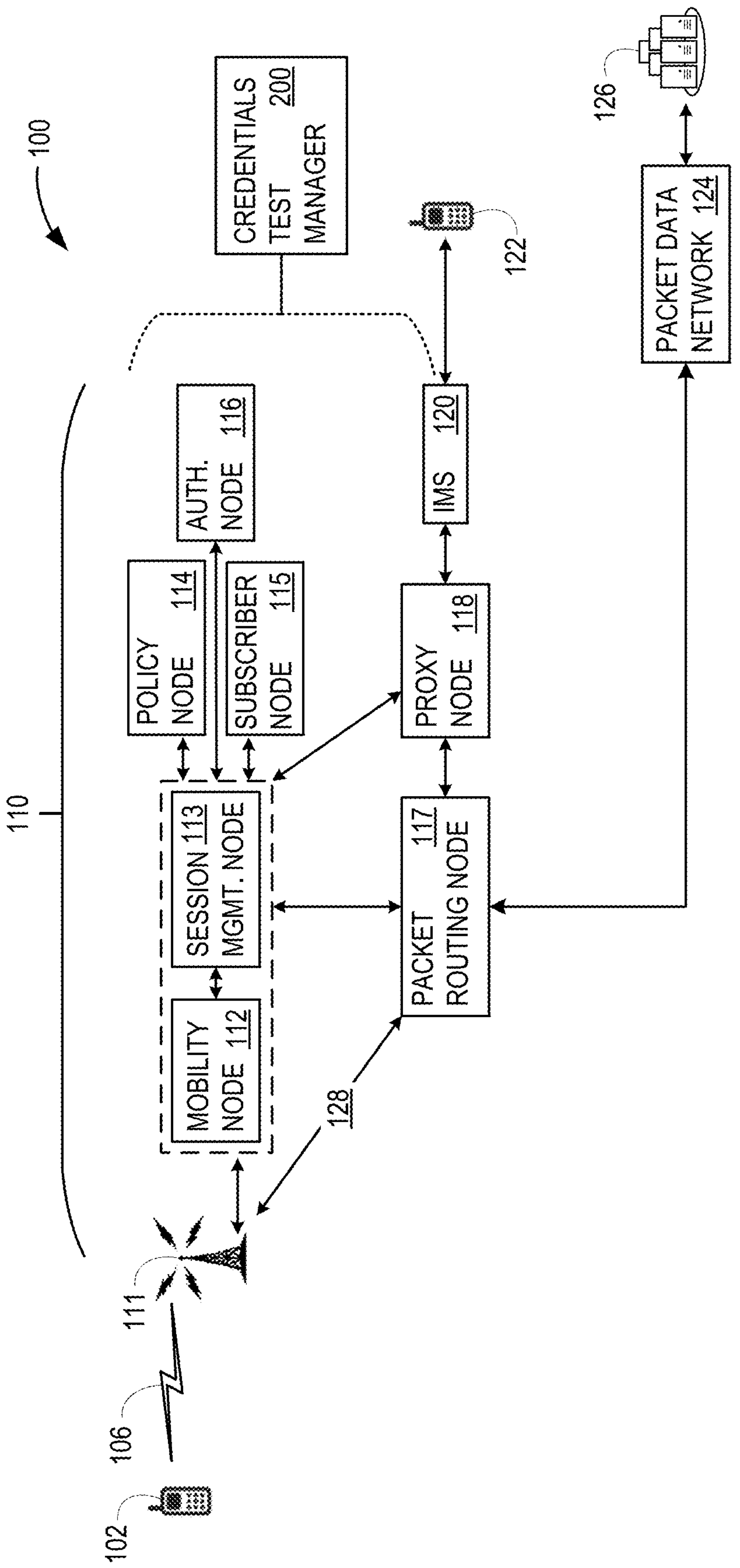
FIG. 1 illustrates an exemplary architecture that advantageously provides for automated credential scanning, rotation, and vaulting.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide for automated credential scanning, rotation, and vaulting. If required, an out-of-band authentication channel (e.g., a multi-factor authentication (MFA) channel) is established for each relevant network function (NF), of a plurality of NFs of a wireless network (e.g., cellular), that is provisioned to use an out-of-band authentication channel, having a subscriber interface and an out-of-band management interface. An attempt to log into each NF is made using test credentials from a first library of credentials and (if required) the NF's an out-of-band authentication channel. The first library of credentials includes default credentials, possibly organized by NF vendors model ID, and easily-guessed credentials.

When the login attempt is successful (meaning the default or easy credentials were being used), new credentials are generated and stored in a password vault (a second library of credentials) associated with the NF. Some NFs may require use of a vendor-specified software application interface for logging in, which is launched and used for the login attempts. This approach may be extended to functional components of a computerized network, such as virtual compute platforms (private/public/hybrid/on-prem/off-prem), routers, switches, load balancers, firewalls, proxies, etc.) and application servers/services (e.g., DNS server, DHCP server, Email server, Web App server, etc.).

Aspects of the disclosure improve the security of wireless communication (e.g., cellular communication) and other large networks by automatically scanning for the type of credentials that are associated with cybersecurity vulnerabilities: default credentials and easily-guessed credentials. The scanning may include the use of a multi-factor authentication channel. When weak credentials are discovered, they are rotated to new credentials, which are vaulted, such as by using a secure password vault. Secure password vaults typically use MFs (i.e., an out-of-band authentication channel). These advantageous results are accomplished, at least in part, by based on successfully logging into a first NF, using the test credentials and the multi-factor authentication channel for the first NF, generating new credentials for the first NF, wherein the new credentials for the first NF are different than all credentials in the first library of credentials.

With reference now to the figures, FIG. 1 illustrates an exemplary architecture 100 that advantageously provides for automated credential scanning, rotation, and vaulting to enhance security for a wireless network 110. Wireless network 110 is illustrated that is serving a UE 102. UE 102 may be a cellphone, a fixed wireless access (FWA) device, internet of things (IoT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 102 uses an air interface 106 to communicate with a base station 111 of wireless network 110, such that base station 111 is the serving base station for UE 102 (providing the serving cell). In some scenarios, base station 111 may be referred to as a radio access network (RAN). Wireless network 110 has a mobility node 112, a session management node 113, a policy node 114, a subscriber node 115, an authentication node 116, and other components (not shown). Wireless network 110 also has a packet routing node 117 and a proxy node 118. Mobility node 112, session management node 113, policy node 114, subscriber node 115, and authentication node 116 are within a control plane of wireless network 110, and packet routing node 117 is within a data plane (a.k.a. user plane) of wireless network 110.

Base station 111 is in communication with mobility node 112 and packet routing node 117. Mobility node 112 is in communication with session management node 113, which is in communication with policy node 114, a subscriber node 115, authentication node 116, packet routing node 117, and proxy node 118. Packet routing node 117 is in communication with proxy node 118 and packet data network 124. In some 5G examples, base station 111 comprises a gNodeB (gNB), mobility node 112 comprises an access mobility function (AMF), session management node 113 comprises a session management function (SMF), policy node 114 comprises a policy control function (PCF), subscriber node 115 comprises a unified data management (UDM), authentication node 116 comprises an authentication server function (AUSF), and packet routing node 117 comprises a user plane function (UPF).

In some 4G examples, base station 111 comprises an eNodeB (eNB), mobility node 112 comprises a mobility management entity (MME), session management node 113 comprises a system architecture evolution gateway (SAEGW) control plane (SAEGW-C), policy node 114 comprises a policy and charging rules function (PCRF), subscriber node 115 comprises a home subscriber server (HSS) which may also provide some of the functionality described herein for authentication node 116, and packet routing node 117 comprises an SAEGW-user plane (SAEGW-U). In some examples, proxy node 118 comprises a proxy call session control function (P-CSCF) in both 4G and 5G.

Proxy node 118 is in communication with an internet protocol (IP) multimedia system (IMS) 120, which uses an access gateway (IMS-AGW) in order to provide connectivity to other wireless (cellular) networks, such as for a call with a UE 122 or a public switched telephone system (PSTN, also known as plain old telephone system, POTS). In some examples, proxy node 118 may be considered to be within IMS 120. UE 102 reaches network resource 126 using packet data network 124 (or IMS 120, in some examples). Data packets of data traffic 128 to/from UE 102 pass through at least base station 111 and packet routing node 117 on their way from/to packet data network 124 or IMS 120 (via proxy node 118).

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

As illustrated in further detail in the remaining figures, and described more fully below in relation to the other figures, a credentials test manager 200 (shown in FIG. 2) advantageously provides for automated credential scanning, rotation, and vaulting with more secure credentials. Although FIG. 1 and some of the following figures are described using an example of a cellular network, it should be understood that the teachings herein are applicable to other types of wireless networks. To benefit from the teachings herein, another wireless network, other than a cellular network, should use login credential for various nodes of the network that may be stored in a secure credential vault, such as a password vault. With such features, another type of wireless network, other than a cellular network, may also benefit from the disclosure herein.

Additionally, other types of networks may also benefit from the teachings herein, such as general computerized networks having a plurality of functional components, each with their own login interface (i.e., each having a unique login interface). Examples include enterprise networks, retail networks, IMS networks, IP transport networks, and others. The NFs of wireless network 110 may be generalized to functional components of another type of computerized network when applying the teachings herein outside the context of wireless networks.

Figure 2:
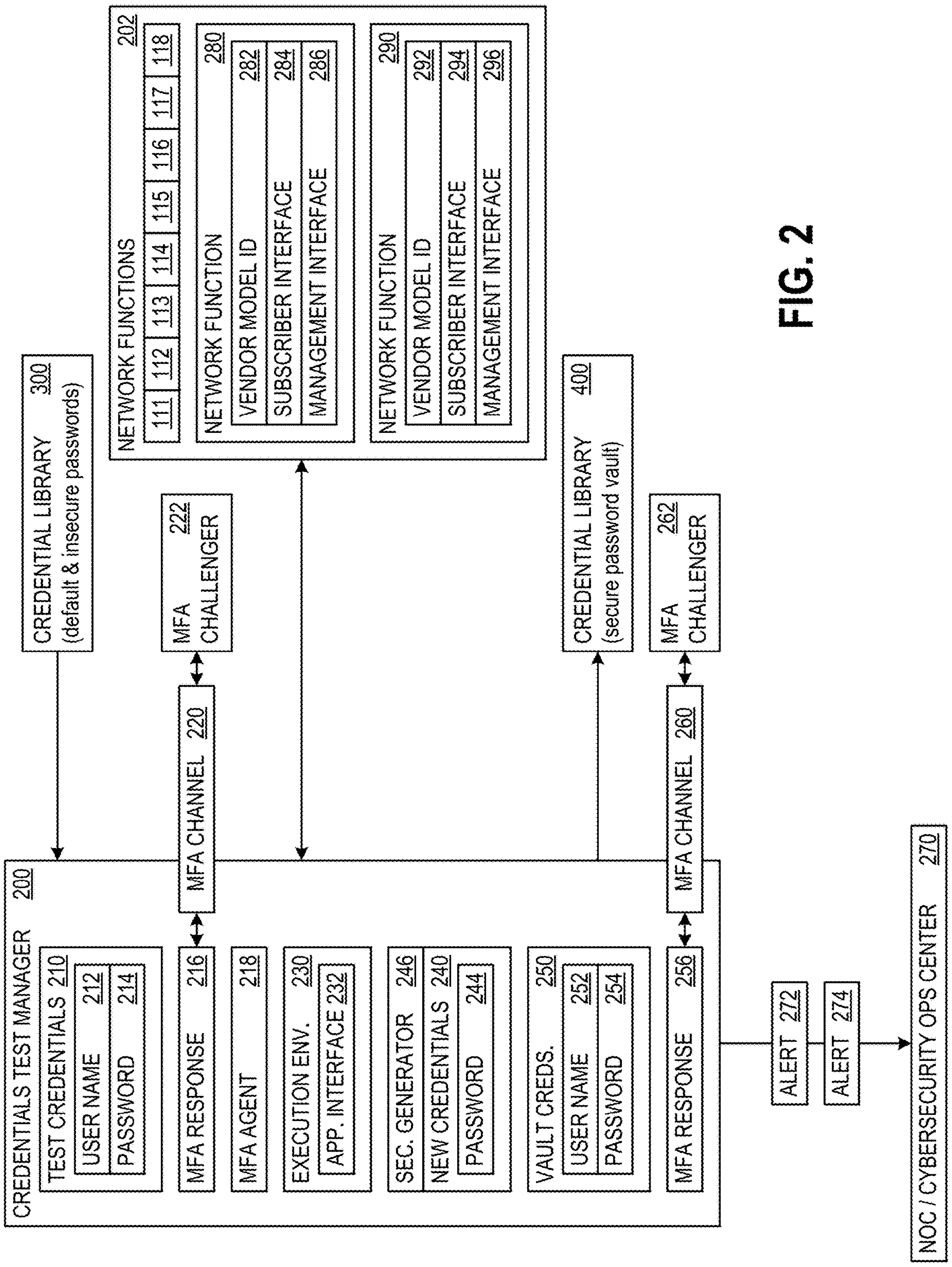
FIG. 2 illustrates further detail for a credentials test manager, as may be used in examples of the architecture of FIG. 1.

FIG. 2 illustrates credentials test manager 200 in further detail. Credentials test manager 200 tests a plurality of NFs 202 of wireless network 110 for weak login credentials, such as default passwords, common passwords, keyboard patterns, dictionary words, and other easily-guessed passwords. As illustrated, plurality of NFs 202 includes base station 111, mobility node 112, session management node 113, policy node 114, subscriber node 115, authentication node 116, packet routing node 117, and proxy node 118. Each type of NF (e.g., base station, mobility node, etc.) may have multiple instances within plurality of NFs 202. Plurality of NFs 202, also includes an NF 280 and an NF 290, which represent generic NFs (i.e., any of the type mentioned previously, or another type), and which are described in further detail below.

Figure 5:
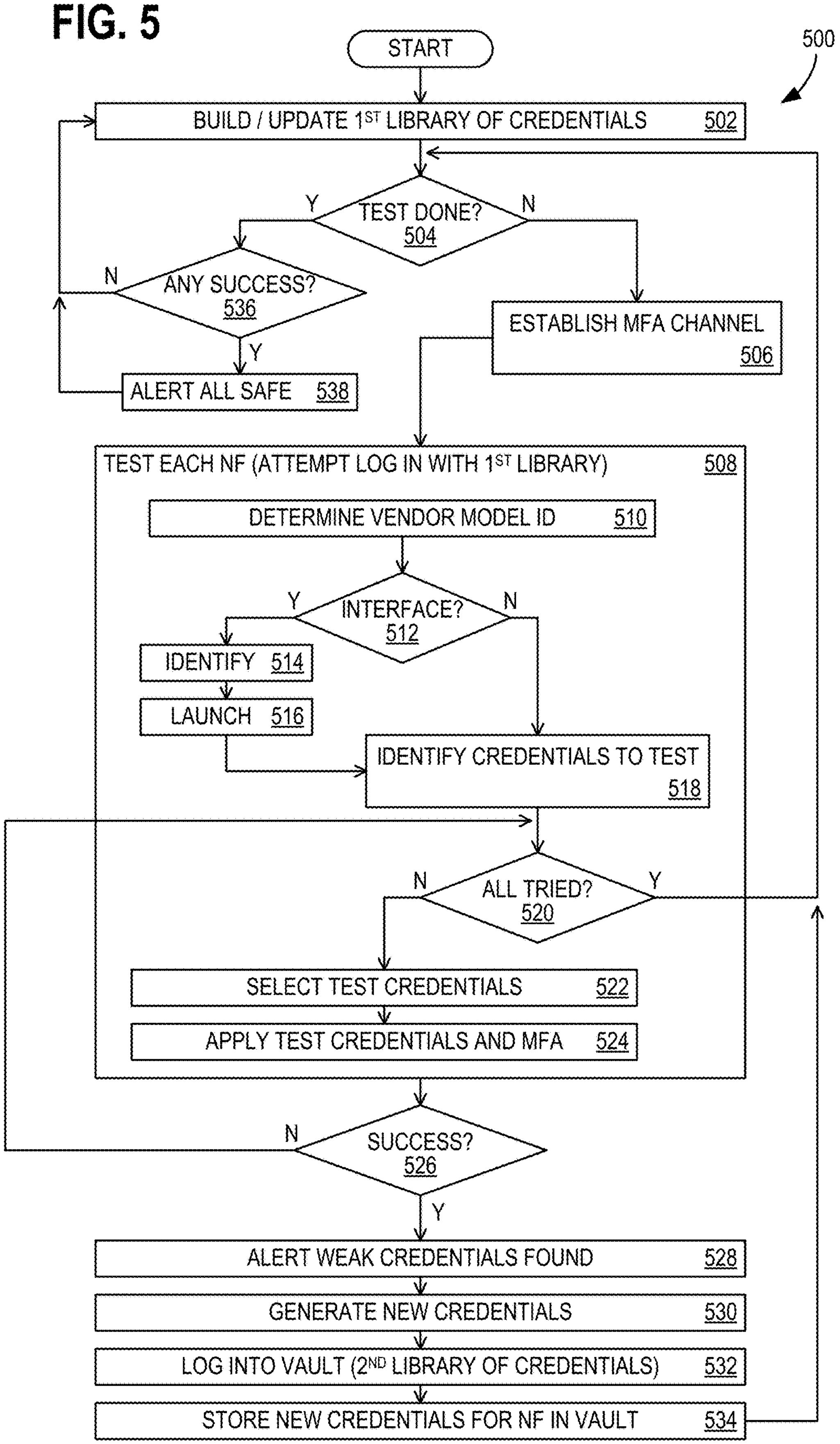
FIGS. 5, 6A, 6B, and 6C illustrate flowcharts of exemplary operations associated with the architecture of FIG. 1.

Credentials test manager 200 is a software component that automatically uses test credentials 210, pulled from a library of credentials 300, to attempt logging into an NF of plurality of NFs 202, such as NF 280 and NF 290 as described in relation to FIG. 5. In general, credentials test manager 200 cycles through all NFs of plurality of NFs 202, and uses all applicable test credentials 210 indicated as relevant in library of credentials 300. Library of credentials 300 is illustrated in further detail in FIG. 3, and described below. Test credentials 210 is illustrated as including a user name 212 and a password 214, although other login credential configurations may also be used, in some examples.

A multi-factor authentication (MFA) channel 220, which may use a virtual private network (VPN) enables credentials test manager 200 to perform meaningful login attempts for NFs that use MFA. In some examples, multi-factor authentication channel 220 comprises a text message channel or an authenticator application. As illustrated a multi-factor authentication agent 218 (e.g., an authenticator app) provides a multi-factor authentication response 216 to a multi-factor authentication challenger 222 during a login attempt. Some NFs may use vendor-provided software application interfaces for logging in (i.e., software provided by the vendor that sells an NF that is used to manage and configure the NF). For such scenarios, an execution environment 230 hosts a software application interface 232 for logging into the NF that requires it. In some examples, software application interface 232 includes a secure shell protocol (SSH) client.

MFA channel 220 represents generally an out-of-band authentication channel, which includes MFA for human users and also solutions for M2M applications. In some examples, credential test manager 200 is within an out-of-band management network of wireless network 110 that is located as necessary to scan all NFs on their management interfaces. In some examples, when credential test manager 200 is not within an out-of-band management network of wireless network 110, credential test manager 200 establishes a VPN connection into the out-of-band management network of wireless network 110. In either scenario, after credential test manager 200 has access to the management interfaces, credential test manager 200 might not require MFA to test credentials via M2M.

When a login attempt is successful using test credentials 210, this indicates that a security vulnerability had existed. Some examples transmit a warning alert 272 to a network operations center (NOC)/cybersecurity operations center 270 to alert security monitors of this condition. If, however, all NFs of plurality of NFs 202 have instead been using only secure login credentials, no test credentials 210 from library of credentials 300 will result in a successful login attempt. Some examples sent another alert 274 to NOC/cybersecurity operations center 270, in this scenario to inform security monitors that the network does not have at least a weak credential vulnerability at the current time.

When a login attempt is successful using test credentials 210, the weak credentials need to be rotated (replaced, changed). A secure password generator 246 which represents generally a secure credential generator, generates new credentials 240 for the affected NF (e.g., NF 280, as described in relation to FIG. 5). New credentials 240 may include a new password 244, which is strong, and which is stored in a library of credentials 400. Library of credentials 400 may be, for example, a password vault. New credentials 240 for NF 280 will be different than all other credentials in library of credentials 300 and library of credentials 400, due to the design and operation of secure password generator 246 as a secure credential generator. For example new password 244 will be different than all other passwords in library of credentials 300 and library of credentials 400.

Credentials test manager 200 uses vault credentials 250 and a multi-factor authentication channel 260 to log into for library of credentials 400. Vault credentials 250 may have both a user name 252 and a password 254. Multi-factor authentication channel 260, may also use a VPN, and may comprise a text message channel or an authenticator application. Multi-factor authentication agent 218 provides a multi-factor authentication response 256 to a multi-factor authentication challenger 262 while logging into library of credentials 400.

NF 280, which may be any NF used by wireless network 110, has a vendor model identification (ID) 282 and both a subscriber interface 284 and an out-of-band management interface 286. Subscriber interface 284 provides the functionality of NF 280 to wireless network 110, such as handling the user data and control signaling that passes through wireless network 110 (e.g., data traffic 128). In contrast, out-of-band management interface 286 is not connected to the public-facing aspect of NF 280, but is instead accessible only through a private network connecting NF 280 to control nodes of wireless network 110.

Credentials test manager 200 uses out-of-band management interface 286 for the login attempts, rather than subscriber interface 284. Another NF 290 is similarly configured, with a vendor model ID 292 and both a subscriber interface 294 and an out-of-band management interface 296.

Figure 3:
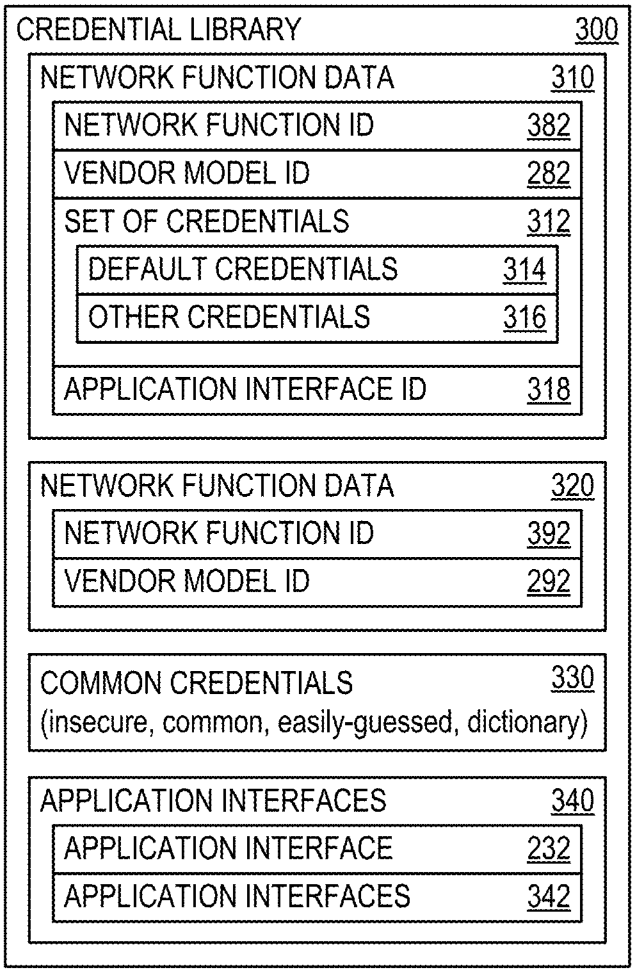
FIG. 3 illustrates further detail for a library of default and common login credentials, as may be used in examples of the architecture of FIG. 1.

FIG. 3 illustrates further detail for library of credentials 300. Library of credentials 300 holds login credentials and other information necessary for credentials test manager 200 to perform the testing of plurality of NFs 202 for weak credentials. For example, network function data 310 for NF 280 includes an ID 382 of NF 280 (which is a unique identifier of NF 280), vendor model ID 282, and a set of credentials 312 for credentials test manager 200 to try specifically with NF 280. Set of credentials 312 may include default credentials 314 for NF 280, such as default credentials specified and coded by the manufacturer (or a later administrator) into NF 280. Default credentials 314 are those that are used to access NF 280 upon initial power-up, factory reset, or (sometimes) a major software upgrade of NF 280.

In some examples, set of credentials 312 contains only default credentials 314. However, in some examples, there may be multiple credentials to try specifically with NF 280, and so set of credentials 312 also includes other credentials 316. Credentials test manager 200 uses both when testing NF 280. If NF 280 requires a software application interface for logging in, a software application interface ID 318 that identifies software application interface 232 is included in network function data 310.

Similarly, network function data 320 for NF 290 includes an ID 392 of NF 290 (which is a unique identifier of NF 290), vendor model ID 292, and other information corresponding to that described for network function data 310, although tailored for NF 290. A set of common credentials 330 includes common credentials, easily-guessed credentials, dictionary words, patterns, and other credentials deemed weak. In some examples, in addition to credentials test manager 200 using all of set of credentials 312 for NF 280 (and a corresponding set of credentials for NF 290) credentials test manager 200 also tests all NFs of plurality of NFs 202 using set of common credentials 330.

The software application interfaces needed to access the NFs for testing are available to credentials test manager 200. In some examples, they are stored within library of credentials 300 as a set of software application interfaces 340. Set of software application interfaces 340 includes software application interface 232 for NF 280 and another software application interface 342 for another NF.

Figure 4:
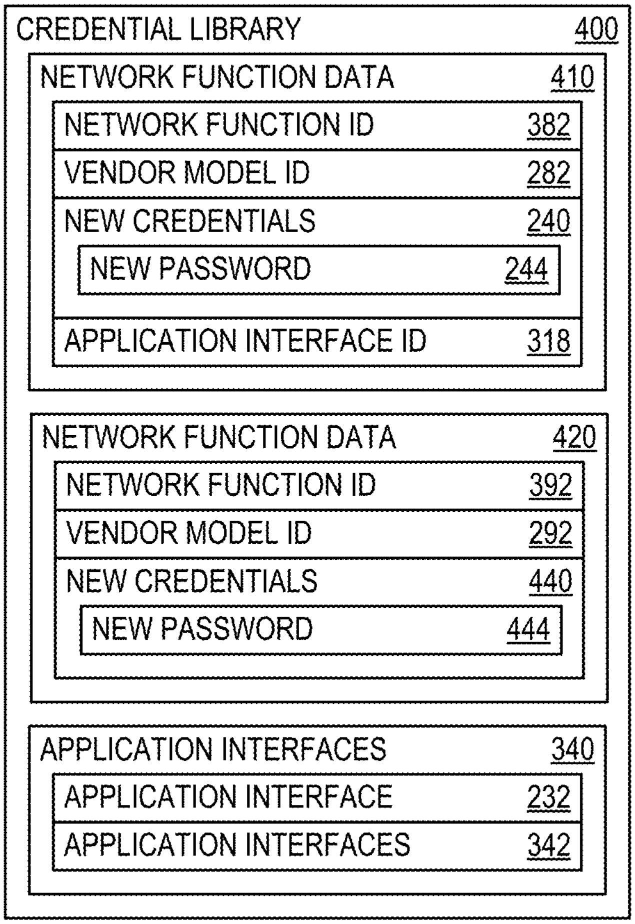
FIG. 4 illustrates further detail for a secure credentials vault, as may be used in examples of the architecture of FIG. 1.

FIG. 4 illustrates further detail for library of credentials 400. Library of credentials 400 may be a password vault and may be organized similarly as library of credentials 400. Network function data 410 for NF 280 includes ID 382 of NF 280, vendor model ID 282, new credentials 240 (generated by secure password generator 246), and software application interface ID 318 that indicates NF 280 requires use of software application interface 232. Similarly, network function data 420 for NF 290 includes ID 392 of NF 290, vendor model ID 292, and new credentials 440 (generated by secure password generator 246) that includes a new password 444.

New credentials 440 for NF 290 will be different than all other credentials in library of credentials 300, and library of credentials 400, due to the design and operation of secure password generator 246 as a secure credential generator. For example new password 444 will be different than all other passwords in library of credentials 300 and library of credentials 400 (including new password 244). In some examples, set of software application interfaces 340 is also stored within library of credentials 400.

FIG. 5 illustrates a flowchart 500 of exemplary operations associated with examples of architecture 100. In some examples, at least a portion of flowchart 500 may be performed using one or more computing devices 700 of FIG. 7. Flowchart 500 commences with building library of credentials 300 in operation 502. This includes collecting default credentials 314 for each vendor model ID represented in plurality of NFs 202, collecting set of common credentials 330, and collecting set of software application interfaces 340 for vendor model IDs requiring them.

Decision operation 504 determines whether all NFs of plurality of NFs have been tested, which initially, is not the case. Flowchart 500 then moves to iterating through operations 506-534 for each NF of plurality of NFs 202, in order for credentials test manager 200 to attempt logging into each NF. Operation 506 establishes multi-factor authentication channel 220 for the current NF being tested (e.g., NF 280), if needed. In operation 508, credentials test manager 200 attempts to log into the current NF using test credentials 210 from library of credentials 300 and multi-factor authentication channel 220. Operation 508 uses operations 510-524.

Operation 510 determines the vendor model ID of the current NF (e.g., vendor model ID 282 when the current NF is NF 280, and vendor model ID 292 when the current NF is NF 290). Decision operation 512 determines whether, based on at least vendor model ID, a software application interface, such as software application interface 232, is required to log into the current NF. If so, operation 514 identifies the software application interface (e.g., an SSH client or other), and operation 516 launches execution of the identified software application interface.

Operation 518 identifies set of credentials 312, within library of credentials 300, that is associated with the vendor model ID of the current NF, and also whether to use set of common credentials 330 in the testing of the current NF. Credentials test manager 200 will iterate through these, using decision operation 520 though operation 524. Decision operation 520 determines whether all credentials to test have been tried, which is not the case in the first pass. So, operations 522-524 are iterated until a successful login or all test credentials identified in operation 518 have been tried. Operation 522 selects the current credentials to try as test credentials 210, and operation 524 tries test credentials 210, by providing them to the current NF, and also responding to multi-factor authentication channel 220. When needed, test credentials 210 are provided to the software application interface, such as software application interface 232 for NF 280. When (if) all test credentials 210 had been tried, without a successful login, flowchart 500 returns to decision operation 504, to move to the next NR in plurality of NFs 202.

However, upon performing operation 524, decision operation 526 determines whether the login attempt is successful. If not, flowchart 500 returns to decision operation 520. If, however, operation 524 does result in a successful login attempt, (e.g., successfully logs into NF 280), operation 528 generates warning alert 272 for NOC/cybersecurity operations center 270.

In operation 530, secure password generator 246 generates a new password (e.g., new password 244 for NF 280). In operation 532, credentials test manager 200 logs into library of credentials 400 using vault credentials 250 and the multi-factor authentication for library of credentials 400 and, in operation 534, stores new credentials 240 for NF 280 in library of credentials 400. Flowchart then return to decision operation 504 to test the next NF.

In a later pass through operations 506-534, the current NF is NF 290. For this later pass, in operation 530, based on successfully logging into NF 290 using test credentials 210 and multi-factor authentication channel 220 for NF 290, secure password generator 246 generates new credentials 440 for NF 290. Operation 534 stores new credentials 440 for NF 290 in library of credentials 400, associated with NF 290.

When all NFs are done with the testing (see decision operation 504), flowchart 500 moves to decision operation 536 which determines whether any login attempts using credentials from library of credentials 300 were successful. If none were, then in operation 538, based on not successfully logging into any NF of plurality of NFs 202, using test credentials from library of credentials 300 and multi-factor authentication channel 220, credentials test manager 200 generates alert 274 for NOC/cybersecurity operations center 270. Alert 274 informs NOC/cybersecurity operations center 270 that the NFs of plurality of NFs 202 are not using insecure credentials. Flowchart 500 then returns to operation 502 to update library of credentials 300 for any new NFs added to wireless network 110.

Figure 6A:
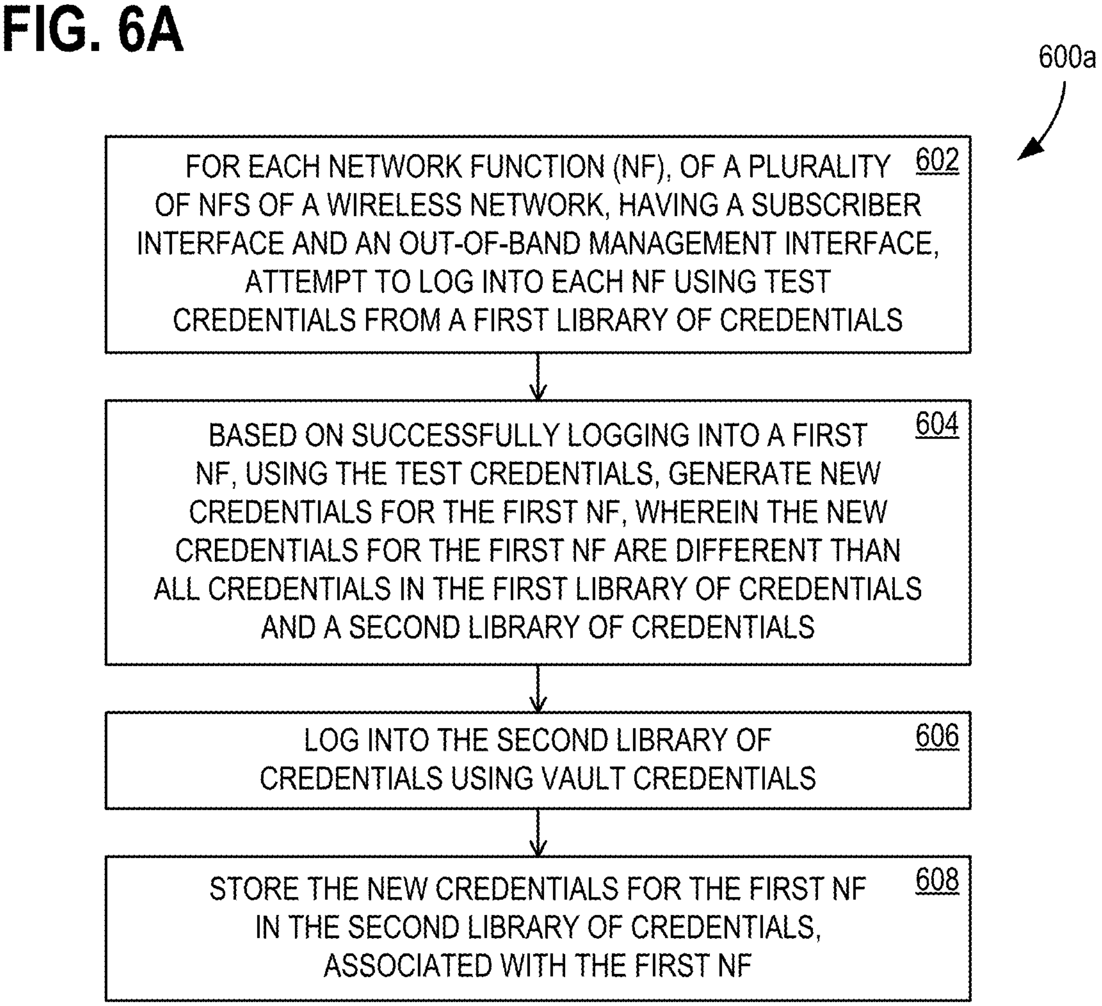

FIG. 6A illustrates a flowchart 600*a* of exemplary operations associated with architecture 100. In some examples, at least a portion of flowchart 600*a* may be performed using one or more computing devices 700 of FIG. 7. Flowchart 600*a* commences with operation 602, which includes, for each NF, of a plurality of NFs of a wireless network, having a subscriber interface and an out-of-band management interface, attempting to log into each NF using test credentials from a first library of credentials.

Operation 604 includes, based on successfully logging into a first NF, using the test credentials and the multi-factor authentication channel for the first NF, generating new credentials for the first NF, wherein the new credentials for the first NF are different than all credentials in the first library of credentials and a second library of credentials. Operation 606 includes logging into the second library of credentials using vault credentials and multi-factor authentication for the second library of credentials. Operation 608 includes storing the new credentials for the first NF in the second library of credentials, associated with the first NF.

Figure 6B:
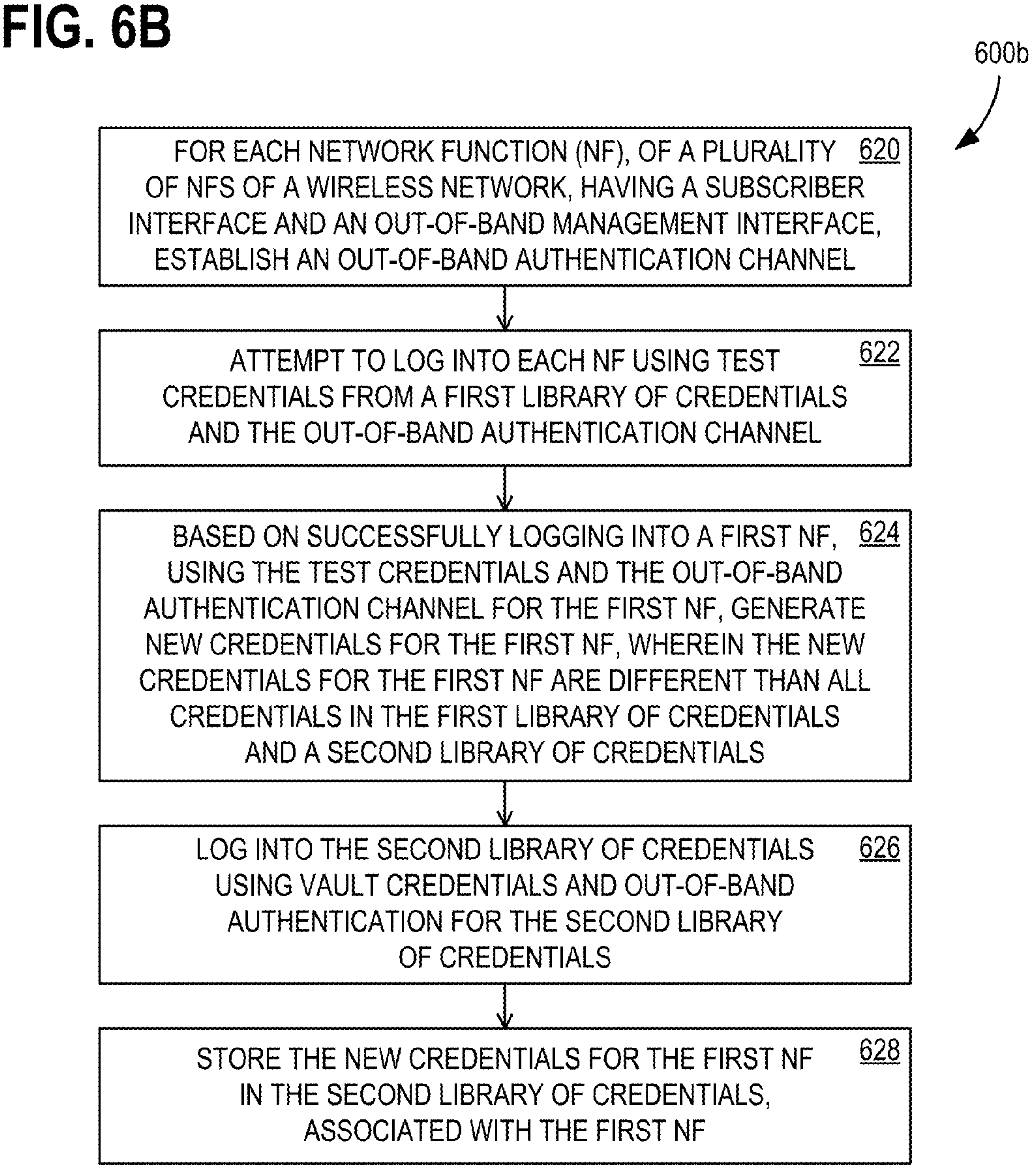

FIG. 6B illustrates a flowchart 600*b* of exemplary operations associated with architecture 100. In some examples, at least a portion of flowchart 600*b* may be performed using one or more computing devices 700 of FIG. 7. Flowchart 600*b* commences with operation 620, which includes, for each NF, of a plurality of NFs of a wireless network, having a subscriber interface and an out-of-band management interface, establishing an out-of-band authentication channel. Operation 622 includes attempting to log into each NF using test credentials from a first library of credentials and the out-of-band authentication channel.

Operation 624 includes, based on successfully logging into a first NF, using the test credentials and the out-of-band authentication channel for the first NF, generating new credentials for the first NF, wherein the new credentials for the first NF are different than all credentials in the first library of credentials and a second library of credentials. Operation 626 includes logging into the second library of credentials using vault credentials and out-of-band authentication for the second library of credentials. Operation 628 includes storing the new credentials for the first NF in the second library of credentials, associated with the first NF.

Figure 6C:
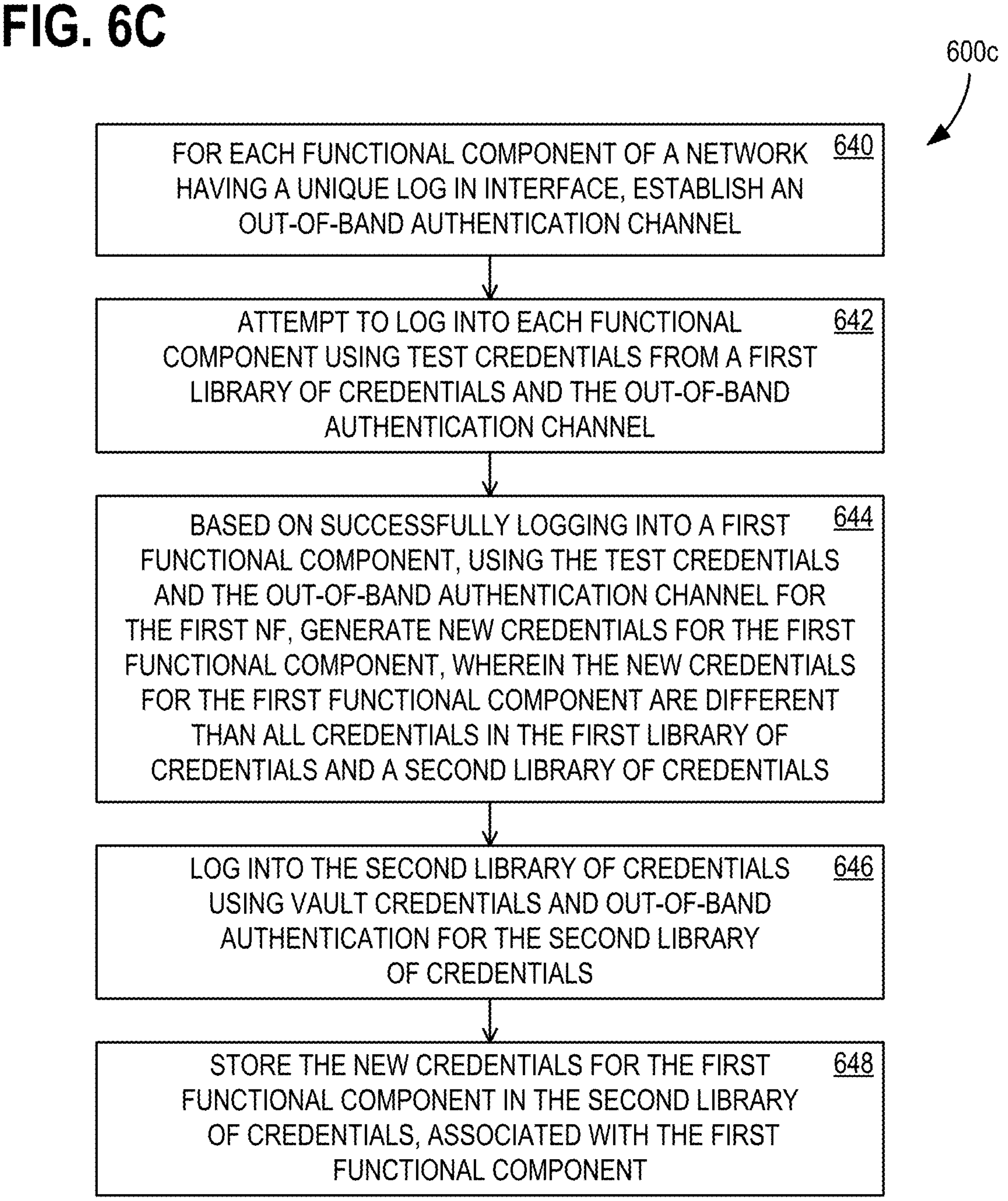

FIG. 6C illustrates a flowchart 600*c* of exemplary operations associated with architecture 100. In some examples, at least a portion of flowchart 600*c* may be performed using one or more computing devices 700 of FIG. 7. Flowchart 600*c* commences with operation 640, which includes, for each functional component of a network having a unique log in interface, establishing an out-of-band authentication channel. Operation 642 includes attempting to log into each functional component using test credentials from a first library of credentials and the out-of-band authentication channel.

Operation 644 includes, based on successfully logging into a first functional component, using the test credentials and the out-of-band authentication channel for the first functional component, generating new credentials for the first functional component, wherein the new credentials for the first functional component are different than all credentials in the first library of credentials and a second library of credentials. Operation 646 includes logging into the second library of credentials using vault credentials and out-of-band authentication for the second library of credentials. Operation 648 includes storing the new credentials for the first functional component in the second library of credentials, associated with the first functional component.

Figure 7:
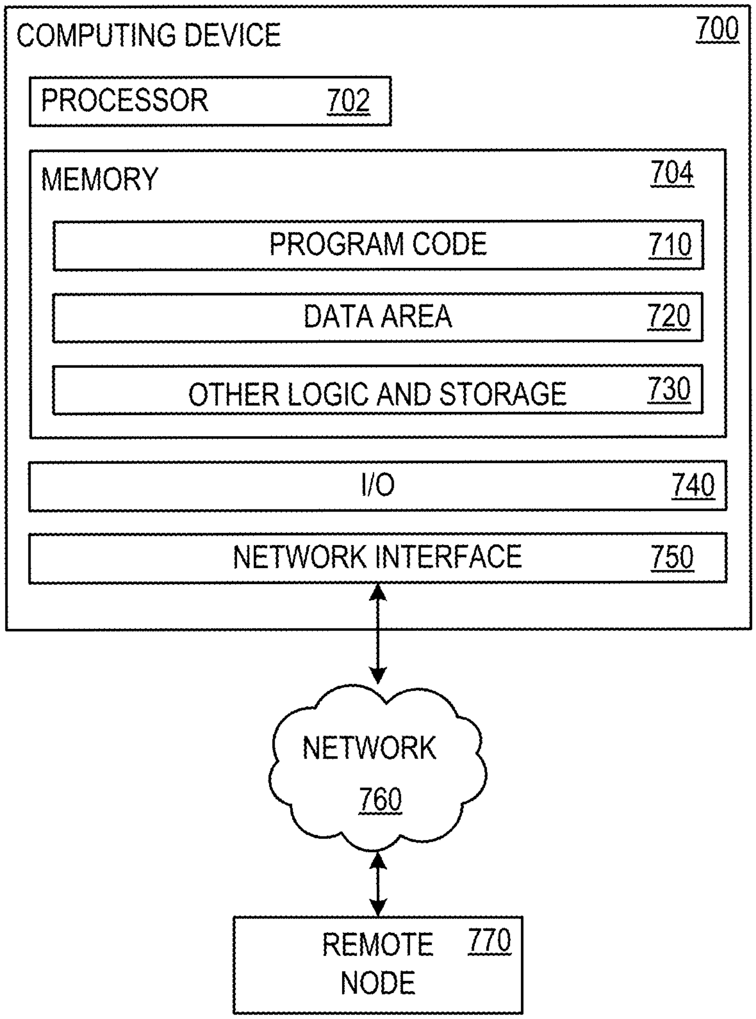
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

ADDITIONAL EXAMPLES

An example system comprises: a processor; and a computer-readable medium storing instructions that are operative upon execution by the processor to: for each NF, of a plurality of NFs of a wireless network, having a subscriber interface and an out-of-band management interface, attempt to log into each NF using test credentials from a first library of credentials; based on successfully logging into a first NF, using the test credentials, generate new credentials for the first NF, wherein the new credentials for the first NF are different than all credentials in the first library of credentials and in a second library of credentials; log into the second library of credentials using vault credentials; and store the new credentials for the first NF in the second library of credentials, associated with the first NF.

Another example system comprises: a processor; and a computer-readable medium storing instructions that are operative upon execution by the processor to: for each NF, of a plurality of NFs of a wireless network, having a subscriber interface and an out-of-band management interface, establish an out-of-band authentication channel; attempt to log into each NF using test credentials from a first library of credentials and the out-of-band authentication channel; based on successfully logging into a first NF, using the test credentials and the out-of-band authentication channel for the first NF, generate new credentials for the first NF, wherein the new credentials for the first NF are different than all credentials in the first library of credentials; log into a second library of credentials using vault credentials and out-of-band authentication for the second library of credentials; and store the new credentials for the first NF in the second library of credentials, associated with the first NF.

Another example system comprises: a processor; and a computer-readable medium storing instructions that are operative upon execution by the processor to: for each functional component of a network having a unique log in interface, establish an out-of-band authentication channel; attempt to log into each functional component using test credentials from a first library of credentials and the out-of-band authentication channel; based on successfully logging into a first functional component, using the test credentials and the out-of-band authentication channel for the first functional component, generate new credentials for the first functional component, wherein the new credentials for the first functional component are different than all credentials in the first library of credentials and in a second library of credentials; log into the second library of credentials using vault credentials and multi-factor authentication for the second library of credentials; and store the new credentials for the first functional component in the second library of credentials, associated with the first functional component.

An example method comprises: for each NF, of a plurality of NFs of a wireless network, having a subscriber interface and an out-of-band management interface, attempting to log into each NF using test credentials from a first library of credentials; based on successfully logging into a first NF, using the test credentials, generating new credentials for the first NF, wherein the new credentials for the first NF are different than all credentials in the first library of credentials and in a second library of credentials; logging into the second library of credentials using vault credentials; and storing the new credentials for the first NF in the second library of credentials, associated with the first NF.

Another example method comprises: for each NF, of a plurality of NFs of a wireless network, having a subscriber interface and an out-of-band management interface, establishing a multi-factor authentication channel; attempting to log into each NF using test credentials from a first library of credentials and the multi-factor authentication channel; based on successfully logging into a first NF, using the test credentials and the multi-factor authentication channel for the first NF, generating new credentials for the first NF, wherein the new credentials for the first NF are different than all credentials in the first library of credentials and in a second library of credentials; logging into the second library of credentials using vault credentials and multi-factor authentication for the second library of credentials; and storing the new credentials for the first NF in the second library of credentials, associated with the first NF.

Another example method comprises: for each functional component of a network having a unique log in interface, establishing an out-of-band authentication channel; attempting to log into each functional component using test credentials from a first library of credentials and the out-of-band authentication channel; based on successfully logging into a first functional component, using the test credentials and the out-of-band authentication channel for the first functional component, generating new credentials for the first functional component, wherein the new credentials for the first functional component are different than all credentials in the first library of credentials and in a second library of credentials; logging into the second library of credentials using vault credentials and multi-factor authentication for the second library of credentials; and storing the new credentials for the first functional component in the second library of credentials, associated with the first functional component.

One or more example computer storage devices has computer-executable instructions stored thereon, which, upon execution by a computer, cause the computer to perform operations comprising: for each NF, of a plurality of NFs of a wireless network, having a subscriber interface and an out-of-band management interface, attempting to log into each NF using test credentials from a first library of credentials; based on successfully logging into a first NF, using the test credentials, generating new credentials for the first NF, wherein the new credentials for the first NF are different than all credentials in the first library of credentials and in a second library of credentials; logging into the second library of credentials using vault credentials; and storing the new credentials for the first NF in the second library of credentials, associated with the first NF.

One or more additional example computer storage devices has computer-executable instructions stored thereon, which, upon execution by a computer, cause the computer to perform operations comprising: for each NF, of a plurality of NFs of a wireless network, having a subscriber interface and an out-of-band management interface, establishing a multi-factor authentication channel; attempting to log into each NF using test credentials from a first library of credentials and the multi-factor authentication channel; based on successfully logging into a first NF, using the test credentials and the multi-factor authentication channel for the first NF, generating new credentials for the first NF, wherein the new credentials for the first NF are different than all credentials in the first library of credentials and in a second library of credentials; logging into the second library of credentials using vault credentials and multi-factor authentication for the second library of credentials; and storing the new credentials for the first NF in the second library of credentials, associated with the first NF.

One or more additional example computer storage devices has computer-executable instructions stored thereon, which, upon execution by a computer, cause the computer to perform operations comprising: for each functional component of a network having a unique log in interface, establishing an out-of-band authentication channel; attempting to log into each functional component using test credentials from a first library of credentials and the out-of-band authentication channel; based on successfully logging into a first functional component, using the test credentials and the out-of-band authentication channel for the first functional component, generating new credentials for the first functional component, wherein the new credentials for the first functional component are different than all credentials in the first library of credentials and in a second library of credentials; logging into the second library of credentials using vault credentials and multi-factor authentication for the second library of credentials; and storing the new credentials for the first functional component in the second library of credentials, associated with the first functional component.

Alternatively, or in addition to the other examples described herein, examples include any combination of the following:

- based on successfully logging into the first NF, using the test credentials and the multi-factor authentication channel for the first NF, generate a warning alert;
- based on not successfully logging into any NF of the plurality of NFs, using test credentials from the first library of credentials and the multi-factor authentication channel, generate a second alert indicating that the NFs of the plurality of NFs are not using insecure credentials;

attempting to log into each NF comprises, for each NF: determining a vendor model ID of the NF; identifying, within the first library of credentials, a set of credentials associated with the vendor model ID; and selecting the test credentials for the NF from among the set of credentials associated with the vendor model ID;

attempting to log into the first NF comprises: determining a vendor model ID of the first NF; determining whether, based on at least the vendor model ID of the first NF, a software application interface is required to log into the first NF; based on at least determining that a software application interface is required to log into the first NF, identifying the software application interface for the first NF; and launching execution of the software application interface for the first NF;

the test credentials for the first NF are provided to the software application interface for the first NF;

based on successfully logging into a second NF, using the test credentials and the multi-factor authentication channel for the second NF, generating new credentials for the second NF;

the new credentials for the second NF are different than the new credentials for the first NF;

the new credentials for the second NF are different than all credentials in the first library of credentials;

storing the new credentials for the second NF in the second library of credentials, associated with the second NF;

the first library of credentials includes default credentials and/or commonly used credentials;

the second library of credentials comprises a password vault;

the multi-factor authentication channel comprises a text message channel or an authenticator application;

the test credentials comprises a user name and/or a password;

the new credentials for the first NF and the new credentials for the second NF each comprises a new password;

a secure password generator generates the new password for the first NF and the new password for the second NF;

the plurality of NFs includes at least three NFs selected from the list consisting of: a base station, a mobility node, a session management node, a packet routing node, a proxy node, a subscriber node, an authentication node, and a policy node;

the wireless network comprises a cellular network;

the base station comprises a gNB or an eNB;

the mobility node comprises an AMF or an MME;

the session management node comprises an SMF or an SAEGW-C;

the packet routing node comprises a UPF or an SAEGW-U;

the proxy node comprises a P-CSCF;

the authentication node comprises an AUSF;

the subscriber node comprises a UDM or an HSS;

the policy node comprises a PCF or a PCRF;

successfully logging into the first NF;

the set of credentials associated with the vendor model ID comprises a single set of credentials;

the set of credentials associated with the vendor model ID comprises default credentials for the vendor model ID;

the out-of-band authentication channel comprises a multi-factor authentication channel;

iterating through the plurality of NFs to attempt logging into each NF; and iterating through the set of credentials associated with the vendor model ID to select all credentials associated with the vendor model ID as the test credentials.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

attempting to login to network functions (NFs) of a wireless network via out-of-band management interfaces of the NFs using test credentials, the out-of-band management interfaces of the NFs being separate from subscriber interfaces of the NFs, wherein attempting to log into the NFs comprises:

determining, based on at least a vendor model identifier (ID) of a first one of the NFs, that a software application interface is required to log into the first NF; and launching execution of the software application interface for the first NF in response to determining that the software application interface is required to log into the first NF; and providing the test credentials to the first NF via the software application interface;

based on successfully logging into the first NF, using the test credentials, generating new credentials for the first NF that are different than the test credentials; and storing the new credentials for the first NF in a library of credentials, associated with the first NF.

2. The method of claim 1, wherein the NFs include at least three NFs selected from a list consisting of:

a base station, a mobility node, a session management node, a packet routing node, a proxy node, a subscriber node, an authentication node, and a policy node.

3. The method of claim 2, wherein the wireless network comprises a cellular network;

wherein the base station comprises a gNodeB (gNB) or an eNodeB (eNB);

wherein the mobility node comprises an access mobility function (AMF) or a mobility management entity (MME);

wherein the session management node comprises a session management function (SMF) or a system architecture evolution gateway (SAEGW) control plane (SAEGW-C);

wherein the packet routing node comprises a user plane function (UPF) or an SAEGW-user plane (SAEGW-U);

wherein the proxy node comprises a proxy call session control function (P-CSCF);

wherein the authentication node comprises an authentication server function (AUSF);

wherein the subscriber node comprises a unified data management (UDM) or a home subscriber server (HSS); and wherein the policy node comprises a policy control function (PCF) or a policy and charging rules function (PCRF).

4. The method of claim 1, wherein the out-of-band management interfaces are interconnected via multi-factor authentication (MFA) channels of a virtual private network (VPN).

5. The method of claim 1, wherein the subscriber interfaces of the NFs are public-facing interfaces for communicating data traffic over the wireless network.

6. The method of claim 1, further comprising:

transmit a warning alert to a network device in response to successfully logging into the first NF using the test credentials, the warning alert indicating that a security vulnerability exists in the first NF.

7. The method of claim 1, wherein attempting to log into the NFs comprises:

providing the test credentials to a second one of the NFs; and transmit an alert to a network device in response to failing to successfully log into the second NF using the test credentials, the alert indicating that the second NF is using secure credentials.

8. The method of claim 1, wherein attempting to log into each NF comprises:

selecting, from a library of test credentials, the test credentials to use for logging into the first NF based on the vendor model ID of the first NF.

9. The method of claim 1, wherein the test credentials are selected from a library of test credentials that includes weak login credentials, and wherein the new credentials for the first NF are different from all of the weak login credentials included in the library of test credentials.

10. The method of claim 9, wherein the weak login credentials include default passwords, common passwords, keyboard patterns, and dictionary words.

11. The method of claim 9, wherein the weak login credentials include easily-guessed passwords.

12. The method of claim 9, wherein the library of credentials comprises a password vault, and wherein the new credentials for the first NF include a new password that is excluded from the library of test credentials.

13. A system comprising:

a processor; and a memory storing programming instructions for execution by the processor, the programming instructions, upon execution by the processor, causing the system to perform the following operations:

attempting to login to network functions (NFs) of a wireless network via out-of-band management interfaces of the NFs using test credentials, the out-of-band management interfaces of the NFs being separate from subscriber interfaces of the NFs, wherein attempting to log into the NFs comprises:

determining, based on at least a vendor model identifier (ID) of a first one of the NFs, that a software application interface is required to log into the first NF; and launching execution of the software application interface for the first NF in response to determining that the software application interface is required to log into the first NF; and providing the test credentials to the first NF via the software application interface;

based on successfully logging into the first NF, using the test credentials, generating new credentials for the first NF that are different than the test credentials and storing the new credentials for the first NF in a library of credentials, associated with the first NF.

14. The system of claim 13, wherein the NFs include at least three NFs selected from a list consisting of:

a base station, a mobility node, a session management node, a packet routing node, a proxy node, a subscriber node, an authentication node, and a policy node.

15. The system of claim 14, wherein the wireless network comprises a cellular network;

wherein the base station comprises a gNodeB (gNB) or an eNodeB (eNB);

wherein the mobility node comprises an access mobility function (AMF) or a mobility management entity (MME);

wherein the session management node comprises a session management function (SMF) or a system architecture evolution gateway (SAEGW) control plane (SAEGW-C);

wherein the packet routing node comprises a user plane function (UPF) or an SAEGW-user plane (SAEGW-U);

wherein the proxy node comprises a proxy call session control function (P-CSCF);

wherein the authentication node comprises an authentication server function (AUSF);

wherein the subscriber node comprises a unified data management (UDM) or a home subscriber server (HSS); and wherein the policy node comprises a policy control function (PCF) or a policy and charging rules function (PCRF).

16. The system of claim 13, wherein the out-of-band management interfaces are interconnected via multi-factor authentication (MFA) channels of a virtual private network (VPN).

17. The system of claim 13, wherein the subscriber interfaces of the NFs are public-facing interfaces for communicating data traffic over the wireless network.

18. The system of claim 13, further comprising:

transmit a warning alert to a network device in response to successfully logging into the first NF using the test credentials, the warning alert indicating that a security vulnerability exists in the first NF.

19. The system of claim 13, wherein attempting to log into the NFs comprises:

providing the test credentials to a second one of the NFs; and transmit an alert to a network device in response to failing to successfully log into the second NF using the test credentials, the alert indicating that the second NF is using secure credentials.

20. A computer program product storing programming instructions for execution by a processor of a system, the programming instructions, upon execution by the processor, causing the system to perform the following operations:

attempting to login to network functions (NFs) of a wireless network via out-of-band management interfaces of the NFs using test credentials, the out-of-band management interfaces of the NFs being separate from subscriber interfaces of the NFs, wherein attempting to log into the NFs comprises:

determining, based on at least a vendor model identifier (ID) of a first one of the NFs, that a software application interface is required to log into the first NF; and launching execution of the software application interface for the first NF in response to determining that the software application interface is required to log into the first NF; and providing the test credentials to the first NF via the software application interface;

based on successfully logging into the first NF, using the test credentials, generating new credentials for the first NF that are different than the test credentials and storing the new credentials for the first NF in a library of credentials, associated with the first NF.

* * * * *